United States Patent
Anderson et al.

(10) Patent No.: US 6,422,718 B1
(45) Date of Patent: Jul. 23, 2002

(54) NON-IMAGING LIGHT SOURCE FOR UNIFORM ILLUMINATION APPLICATIONS

(75) Inventors: Keith Anderson, Pelsall; Geoffrey Archenhold, Slough; Kurt Baldwin, Walsall, all of (GB); Andrew Neal, Salt Point, NY (US)

(73) Assignee: Integrated Systems Technologies Limited, Brownhills (GB)

( * ) Notice: Subject to any disclaimer, the term of this patent is extended or adjusted under 35 U.S.C. 154(b) by 0 days.

(21) Appl. No.: 09/442,913

(22) Filed: Nov. 18, 1999

(51) Int. Cl.$^7$ ................................................. F21V 7/04
(52) U.S. Cl. ...................... 362/296; 362/310; 362/347; 362/350; 362/558
(58) Field of Search ................................ 362/551, 552, 362/554, 580, 583, 227, 235, 236, 247, 294, 296, 310, 317, 341, 347, 350, 307, 297, 298, 300, 558

(56) References Cited

U.S. PATENT DOCUMENTS

| | | | |
|---|---|---|---|
| 4,517,631 A | | 5/1985 | Mullins et al. |
| 4,687,285 A | * | 8/1987 | Hily et al. ................ 350/96.18 |
| 5,115,384 A | * | 5/1992 | Loth et al. .................... 362/301 |
| 5,134,550 A | | 7/1992 | Young et al. |
| 5,190,536 A | | 3/1993 | Wood et al. |
| 5,278,731 A | * | 1/1994 | Davenport et al. ........... 362/32 |
| 5,303,135 A | | 4/1994 | Sprecher |
| 5,341,275 A | * | 8/1994 | Ghandehari ................... 362/32 |
| 5,396,350 A | | 3/1995 | Beeson et al. |

FOREIGN PATENT DOCUMENTS

| | | |
|---|---|---|
| GB | 2182130 | 5/1987 |
| GB | 2324364 | 10/1998 |
| WO | WO 8903235 | 4/1989 |

* cited by examiner

Primary Examiner—Sandra O'Shea
Assistant Examiner—Ismael Negron
(74) Attorney, Agent, or Firm—Lackenbach Siegel Marzullo Aronson & Greenspan (57) ABSTRACT

A light source system in which light scattered inside a chamber (2) exits from a hole (3) to provide a light output from the system. The interior wall of the chamber (2) consists of a material which is very efficient at scattering incident light. Light emitted from a light source (1) undergoes at least one scattering event within the chamber (2) before escaping from the chamber (2) through the exit hole (3). Any geometrical attributes of the light from the source (1) are removed before the light exists from the chamber (2). The exit hole (3) can have a tube inside (4) and/or outside (5) the chamber (2) for collimating the light output. A mechanical shutter (7, 8) can be used as a simple dimmer mechanism for the light output from the system. The light source (1) can be positioned inside or outside the chamber (2).

19 Claims, 14 Drawing Sheets

NON-IMAGING LIGHT SOURCE FOR UNIFORM ILLUMINATION APPLICATIONS

BACKGROUND OF THE INVENTION

This invention relates to light sources, especially those applied to luminaire systems. It is particularly useful in providing a uniform illumination source whose luminosity can be controlled, or for coupling light into one or a plurality of optic fibres.

The aim of any light source is to collect as much light as possible that is emitted from a bulb, and to direct this light into the chosen direction. This has traditionally been achieved using a reflector behind the bulb to collect the light that is emitted backwards or sideways, and to reflect this light into a forward direction. The reflector is acting as an imaging optic, providing a (blurred) image of the bulb filament in the forward direction.

The light source described in this invention does not image the bulb filament, but scatters the emitted light within a chamber. The chamber is arranged to have an exit means for the scattered light to escape, and thus provide an output. The principle is similar to that used for integrating spheres. Here a light source is placed inside a sphere whose interior is coated with an efficient reflective or scattering material. Typical efficiencies are >99% for the incident light being reflected or scattered, which means that very little light is absorbed by the inside surface of the sphere. The light emitted from the light source is thus scattered many times within the sphere, effectively randomising the direction of travel of the photons. Any particular portion of the inside of the sphere will have the same light power incident upon it. When a small light detector is placed at the surface of the sphere, the reading on the detector will be proportional to the total amount of light emitted from the source, independent of the direction that it was emitted in. This type of photometric analysis is the usual application of these devices.

SUMMARY OF THE INVENTION

It is an object of this invention to use an efficient scattering chamber as a uniform illumination light source.

According to the present invention, there is provided apparatus comprising:

a light source;

a scattering chamber having an internal surface for scattering light from the light source; and an exit port in the chamber which provides a light output.

By this invention, the exit port emits a uniform light intensity, independent upon the directional properties of the light source, e.g. an emission light bulb. In other words, a non-imaging light source is provided in which any information about the spatial distribution of the light emission is removed by multiple scattering events as the photons pass across the inside of the chamber.

The light source can be any of the following:
a) Fluorescent light, linear and compact
b) Halogen incandescent lamps
c) Incandescent light bulbs
d) Tungsten filament lamps
e) High intensity discharge (HID) lamps
f) Light emitting diodes (LEDs) all/different colours
g) Electroluminescent lamps
h) Radioluminescent lamps
i) Radiofrequency (RF) lamps
j) Microwave light sources
k) Laser light sources The light source may consist of one or more light emitters positioned internally and/or externally of the chamber. Where more than one emitter is provided, these may be the same or different. Where an external emitter is provided, the chamber has an entrance port for light to enter the chamber. More than one entrance port may be provided.

The chamber may be adapted to reduce heat build-up within the chamber and/or in the light output at the exit port. For example, one or more windows may be provided with reflective/transmissive properties for separating visible light and infrared radiation (heat). Thus a window may be provided in the chamber wall to transmit infrared radiation out of the chamber and reflect visible light within the chamber and/or a window may be provided in the exit port to transmit visible light out of the chamber and reflect infrared radiation within the chamber.

The intensity of the light output may be controlled by varying the intensity of the light source. This may be achieved by mechanical, electrical or electronic systems. A mechanical system may employ an adjustable shutter for covering the light source. This is particularly simple and can take various forms, for example, a sliding cover or an iris diaphragm. More than one exit port may be provided.

Specific embodiments of the invention will now be described by way of example, with reference to the accompanying drawings.

DETAILED DESCRIPTION OF THE EXEMPLARY EMBODIMENTS

Figure 1:
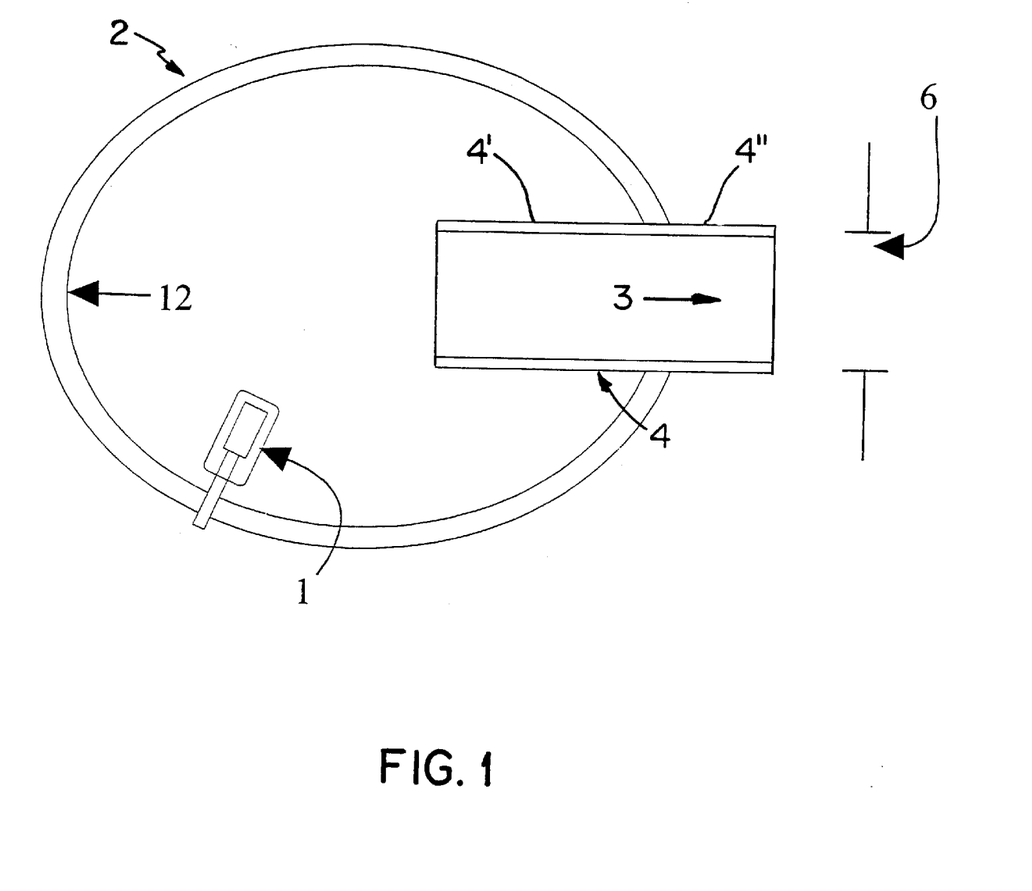
FIG. 1 is a schematic diagram of the system consisting of an internal light source, scattering chamber and exit port geometry for controlling the light output.

Referring to the drawings, the system shown in FIG. 1 has a light source 1 located inside a chamber 2 having an internal surface which is an efficient light scatterer. This chamber is similar to an integrating sphere.

The chamber 2 has an exit port 3 which provides the light output, which in the case of a luminaire is directed towards a gate 6. The distribution of light intensity, and the collimination of the light can be controlled using a tube 4 for the exit port 3. The tube 4 may have an internal portion 4' and/or an external portion 4'.

The degree of collimation of the light emitted from the chamber 2 will depend upon the ratio of the length of tube 4 to the diameter of tube 4. The tube 4 must not extend too far into the chamber 2 so that it shadows the chamber wall in region 12 which is the surface emitting light towards the exit port 3 of the chamber. The outside of the tube 4 should be an efficient light scatterer so that it acts like a part of the internal surface of the chamber 2 and therefore does not absorb the photon energy within the chamber.

The preferred location of the light source 1 is for it to be positioned in the chamber 2 so that there is no direct path for the light emitted from the light source 1 to the exit port 3 of the chamber 2. One such position is shown in FIG. 1. If there were a direct path, then the light emitted from the chamber 2 would no longer have a uniform spatial distribution.

The output intensity of a light system is usually controlled by adjusting the electrical power feed to the light source (bulb). This requires additional electronics to be able to provide this level of control.

The use of the scattering chamber light source means that the output level can be controlled by a mechanical means, such as a shutter, which physically covers the light source. This could not be performed using a conventional reflector/ condenser arrangement because the edge of the shutter would form an image over the exit gate. This non-imaging source arrangement does not image the local light source, and so can still provide a uniform light level across the exit, independent of the amount of the local light source that is covered by a shutter. This is illustrated by way of two example embodiments in FIGS. 2A and 2B.

Figure 2A:
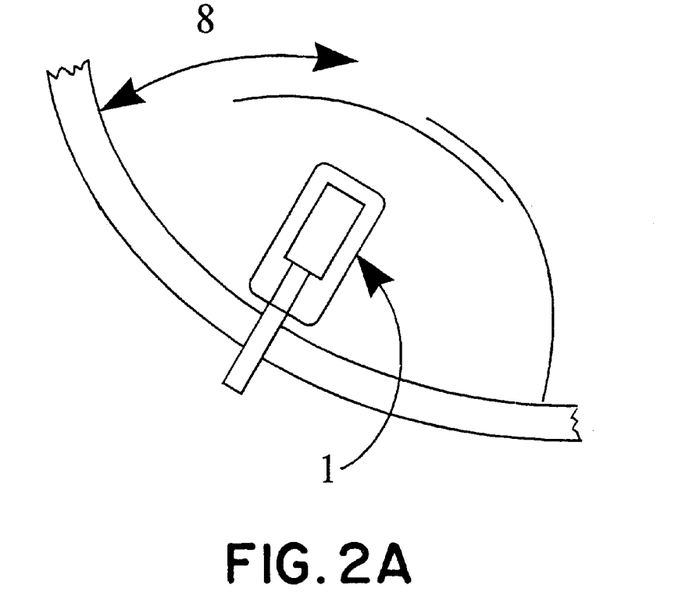
FIGS. 2A and 2B are schematic diagrams of methods for controlling the light intensity by mechanical means.
Figure 2B:
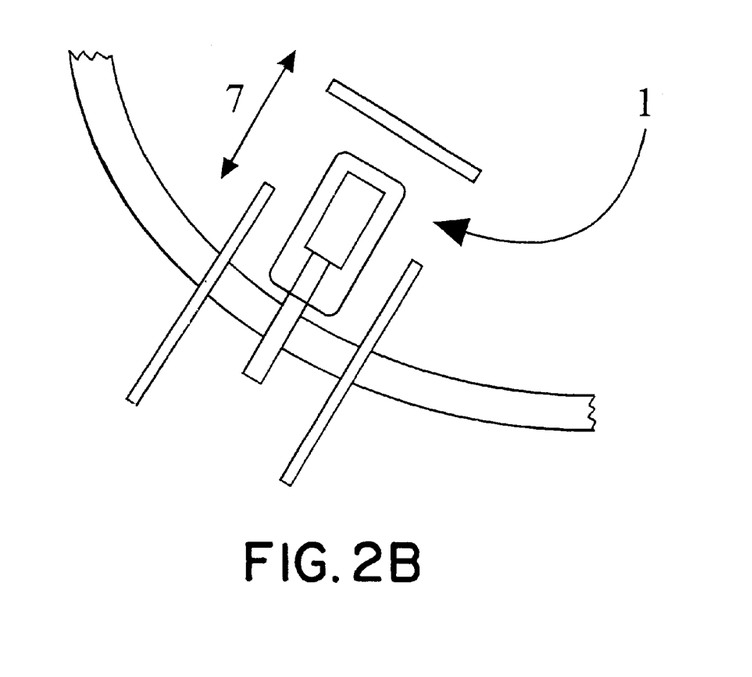

FIG. 2A shows a cross section of a sliding dome cover 8 over the light source 1. FIG. 2B shows a cylindrical cover 7 which can be moved to fully enclose the light source 1 using an end cover. The mechanical shutter can be controlled, for example using a simple motor (stepper or DC) and simple electronics, or manually using some mechanical attachment to the outside of the system. Thus the system negates the need for complicated dimming electronics.

Figure 3:
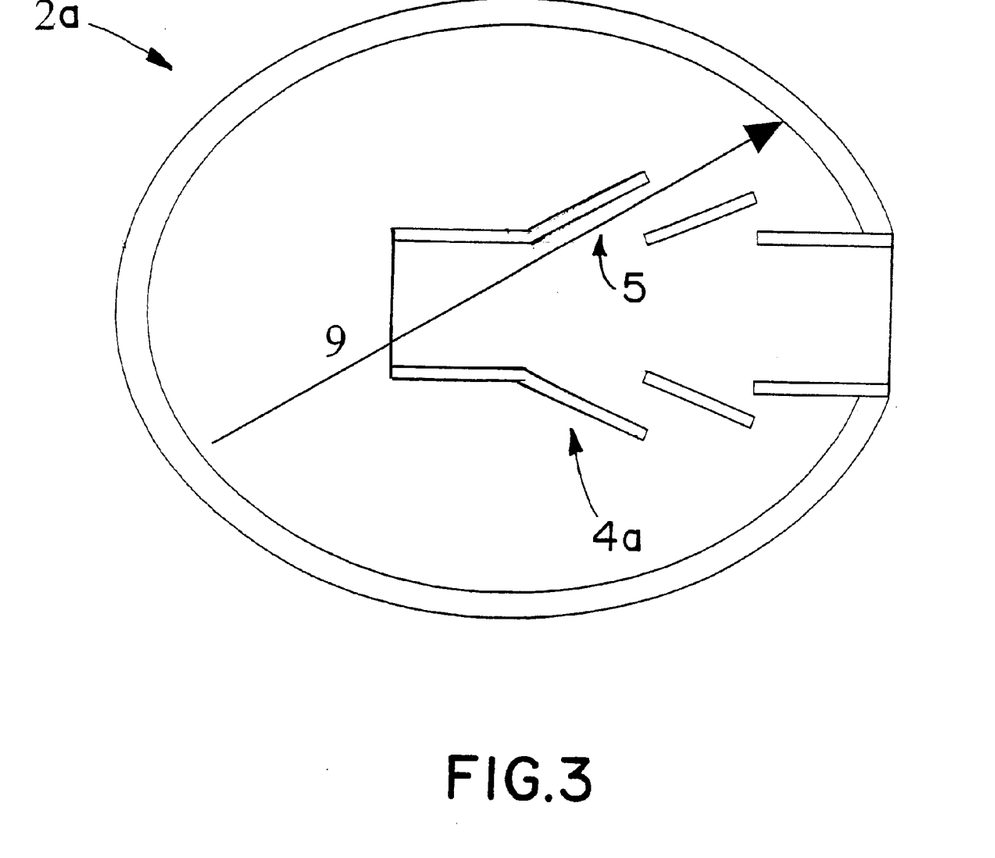
FIG. 3 is a schematic diagram of a design of an internal portion of a colliminating tube which can increase the output light level by recollecting some of the undesirable rays of light.

As shown in FIG. 3, an internal portion of a colliminating tube 4a can be designed with slats 5 to transmit some of the light that is incident on the inside of the tube 4a. The rays of light 9 that are transmitted by the slats 5 pass back into the bulk of the chamber 2a to undergo more scattering processes. The use of the slats 5 would therefore increase the overall light output intensity because it reduces the amount of absorption surfaces (if for example the inside of the tube 4a was an absorption surface), or unwanted output rays of light from within the system (if for example the ray of light 9 were reflected off the tube 4a, it would propagate through the exit port 3 of the chamber 2a at a steep angle).

Figure 4:
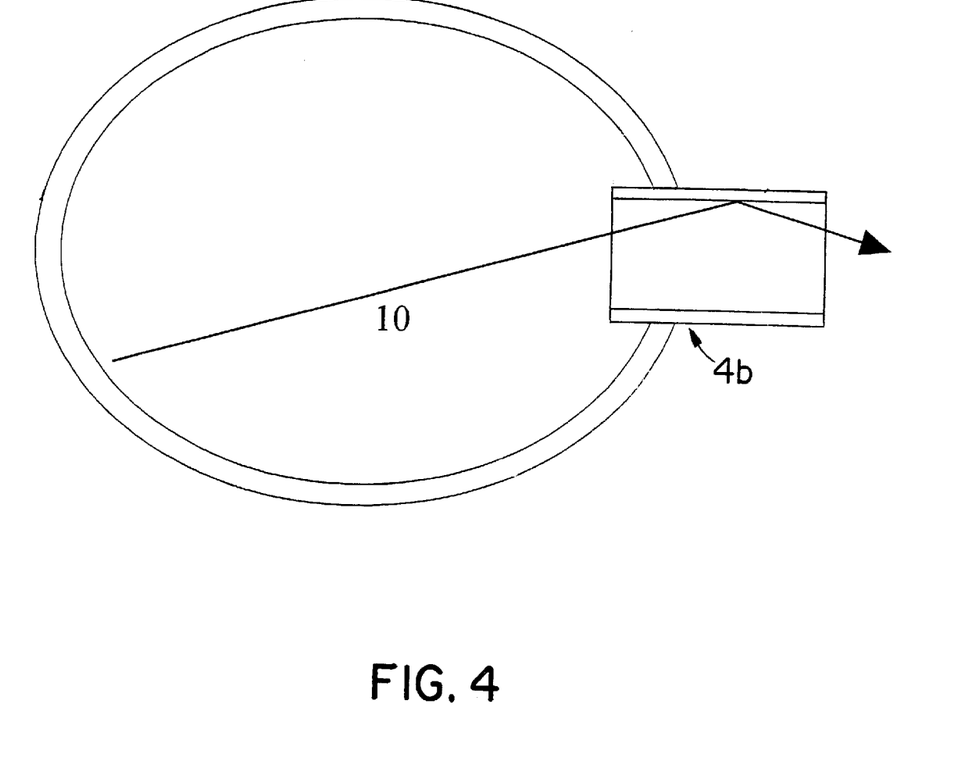
FIG. 4 is a schematic diagram of a design of an external portion of a collimating tube.

An external portion of a colliminating tube 4b can also be used to control the degree of collimation of the output, as illustrated in FIG. 4. Slats in the external portion of tube 4b would not increase the light level as described above for the internal portion of the tube 4a because the rays of light escaping through such slats in external portion would be lost from the system. However, it may be advantageous to make the inside of the external portion into a mirror-like surface. The rays of light 10 that are incident on the inside of the external portion will be at a grazing angle, especially if the external portion is used in conjunction with an internal portion. This means that the reflection from the internal surface of the external portion will help to concentrate the light into the required region (e.g., the external gate 6 shown in FIG. 1).

Figure 5:
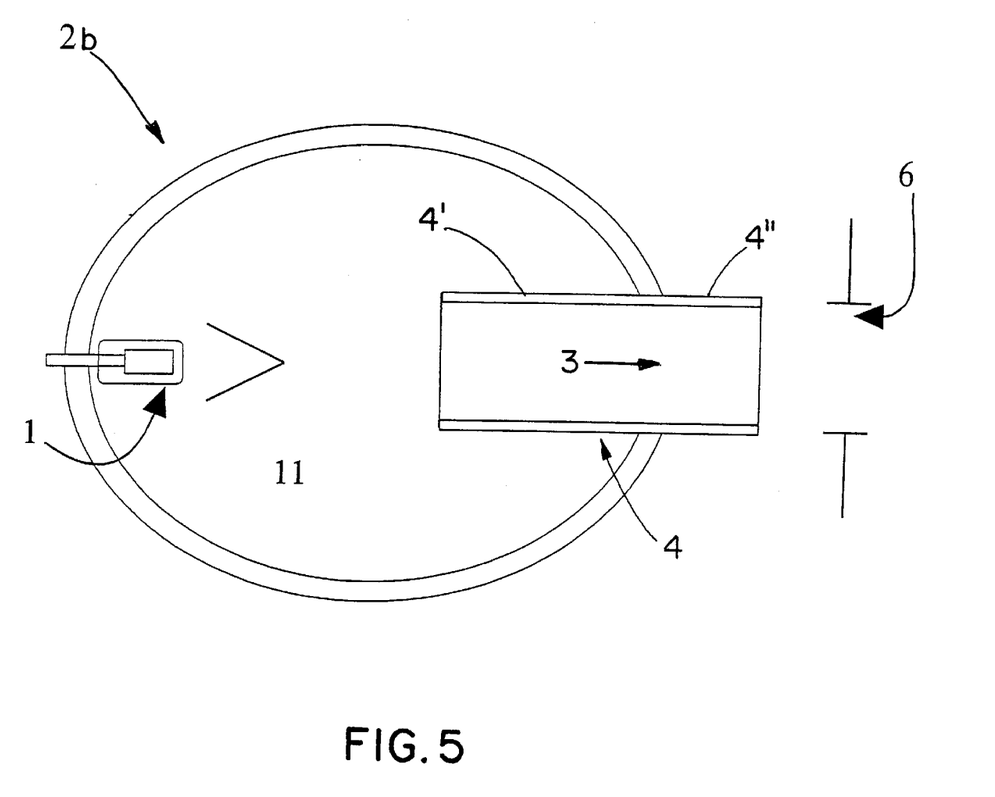
FIG. 5 is a schematic diagram of the system with the light source mounted axially, and with a mirrored cone obscuring the direct path of rays from the light source to the exit port.

The whole light source system may be made axially symmetric, as illustrated in FIG. 5. This may have some advantages with manufacture. A mirror or scattering cone 11 could be used to shield the exit port 3 from a direct line of sight of the light source 1. The output light would come from the vicinity of the lateral circumference of a chamber 2b via a reflection off the mirror or scattering cone 11.

Figure 6:
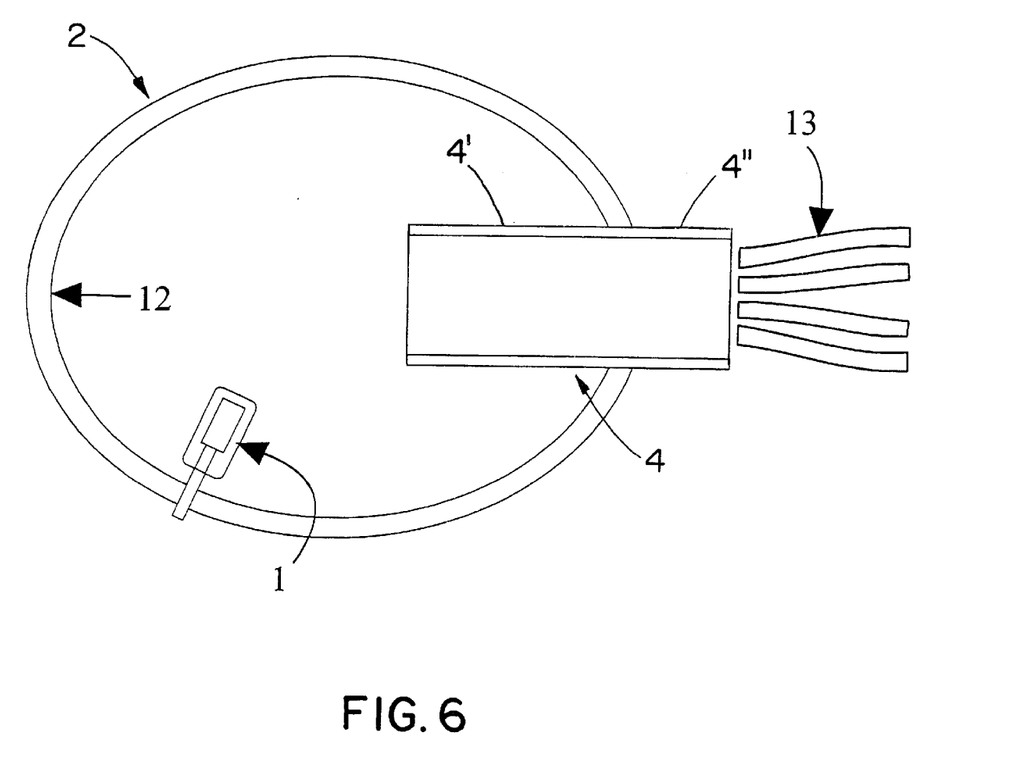
FIG. 6 is a schematic diagram of the system with optical fibres at the output.
Figure 7:
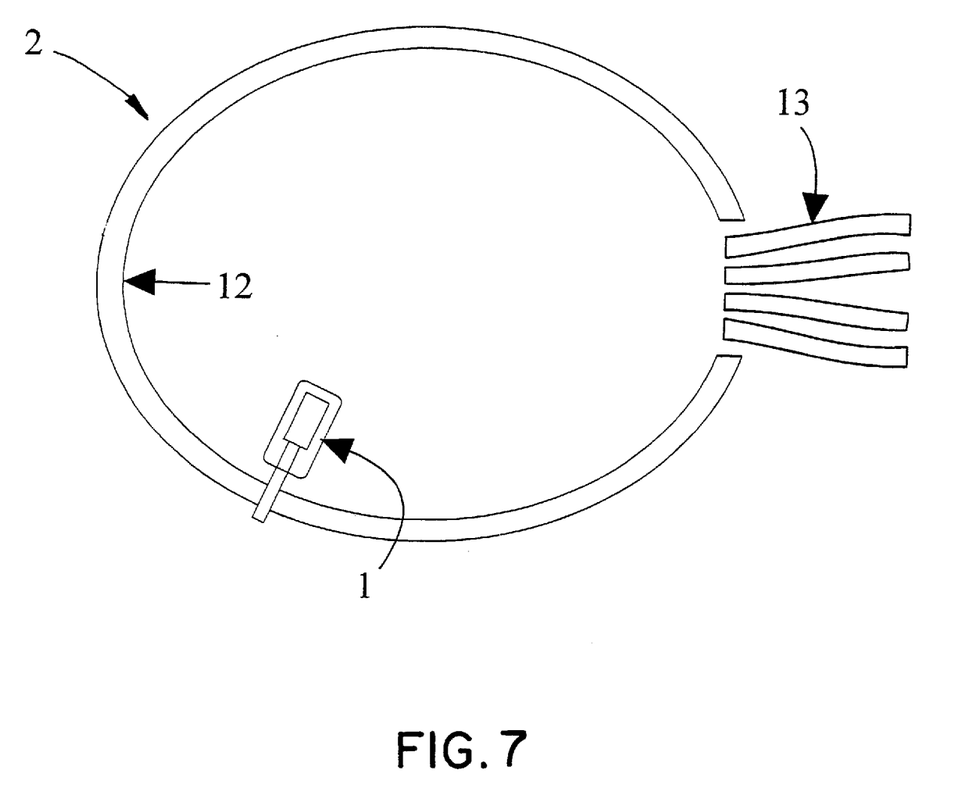
FIG. 7 is a schematic diagram of the system with the ends of optical fibres positioned in the vicinity of the wall of the scattering chamber.

The scattering chamber system can also provide an efficient means of coupling light from the light source 1 into one, or a plurality, of optic fibres 13, as illustrated by FIG. 6. The fibres 13 can be positioned anywhere in the output path of the chamber 2. FIG. 6 shows the fibres at the end of the external portion 4". The use of the tube 4 would help to control the range of angle of the light incident upon the ends of the fibres, hence controlling the efficiency of coupling light into the fibres (which will have a limited acceptance angle). The fibres 13 could also be positioned such that their ends are in the vicinity of the wall of the chamber, as sown in FIG. 7. This configuration has the advantage of simplicity over that shown in FIG. 6.

Figure 8:
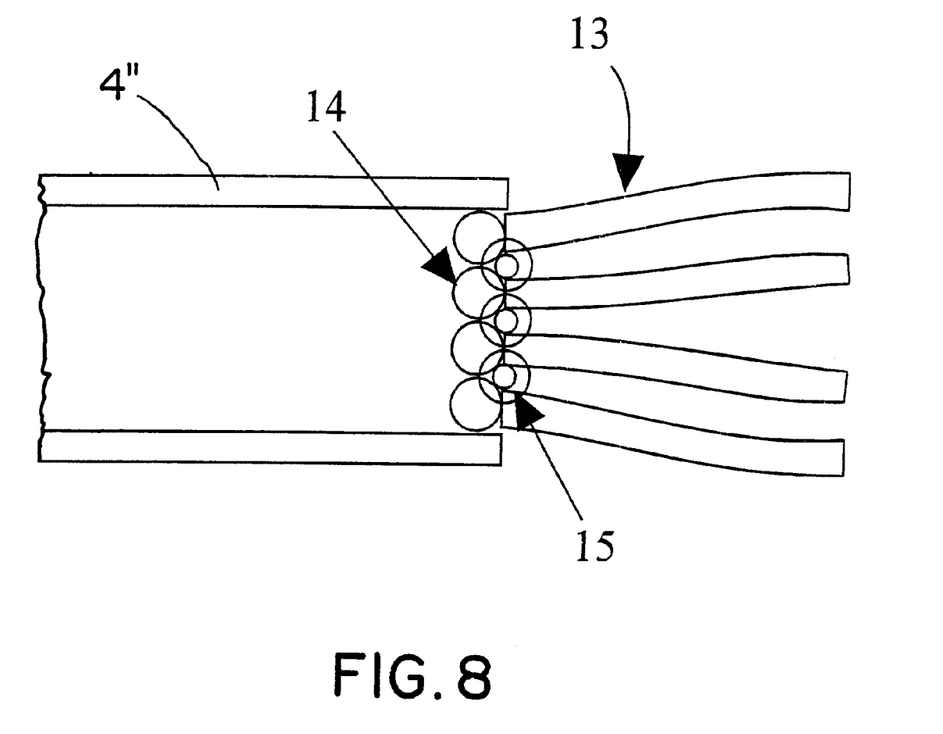
FIG. 8 is a schematic diagram of the output system with optical fibres, ball lenses, and alignment balls.
Figure 9:
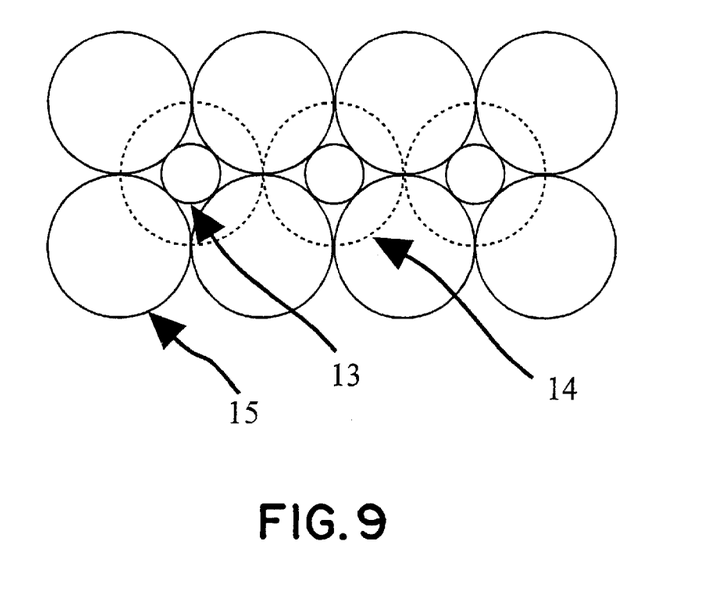
FIG. 9 is a different view of the output system of FIG. 8, showing a packing arrangement of the balls and optic fibres.

The light can also be focused into the fibres 13 using ball lenses. An embodiment of this system is shown in FIG. 8. Ball lenses 14 are transparent spheres which act to couple light from an external source into the optic fibre 13. A potential problem with this arrangement is aligning the ball lenses 14 with the ends of the optic fibres. This can be aided using a second layer of spheres 15 (e.g. ball bearings), which would stack over the interstitial regions of the ball lenses 14, thus providing a location pocket for the optic fibres. This is also illustrated in a different projection in FIG. 9, for the case of a cubic packing arrangement. There are many packing arrangements (which are well known from crystallography), including hexagonal close packing which has a larger packing density than the cubic arrangement shown. The schematic diagram of FIG. 9 shows the case with the optic fibre 13 being smaller in diameter than the spheres 15. The packing principle would work as well if the fibre had a larger diameter than the alignment bearing, or if they were of similar diameter.

A potential problem with many luminaire systems is the removal of the heat emitted from the light source 1. Since the system described thus far is a relatively enclosed system housing the light source 1 within a chamber, this is a matter that requires some attention. To this end, a window 16 can be incorporated into the wall of a chamber 2c, as illustrated in FIG. 10 having a reflection/transmission characteristic that efficiently reflects visible radiation, but transmits infra red radiation (heat) thereby helping to reduce any build-up of heat within the chamber.

Figure 10:
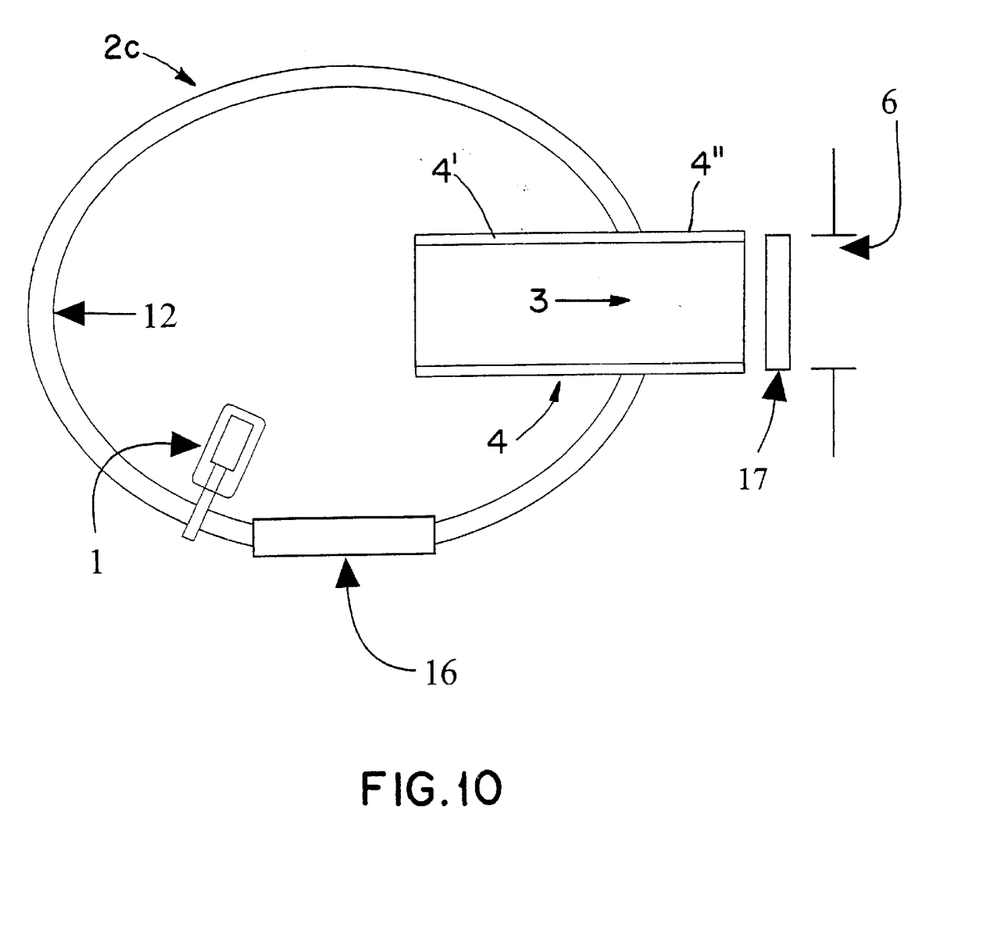
FIG. 10 is a schematic diagram of the system with mirrors to remove some of the infrared heat.

Alternatively or additionally, a window 17 can be introduced into the output path from the chamber 2c as also illustrated in FIG. 10 having a reflection/transmission characteristic that efficiently transmits visible light and reflects infra red radiation (heat) so as to help to reduce the heat at the output of the system.

Figure 11:
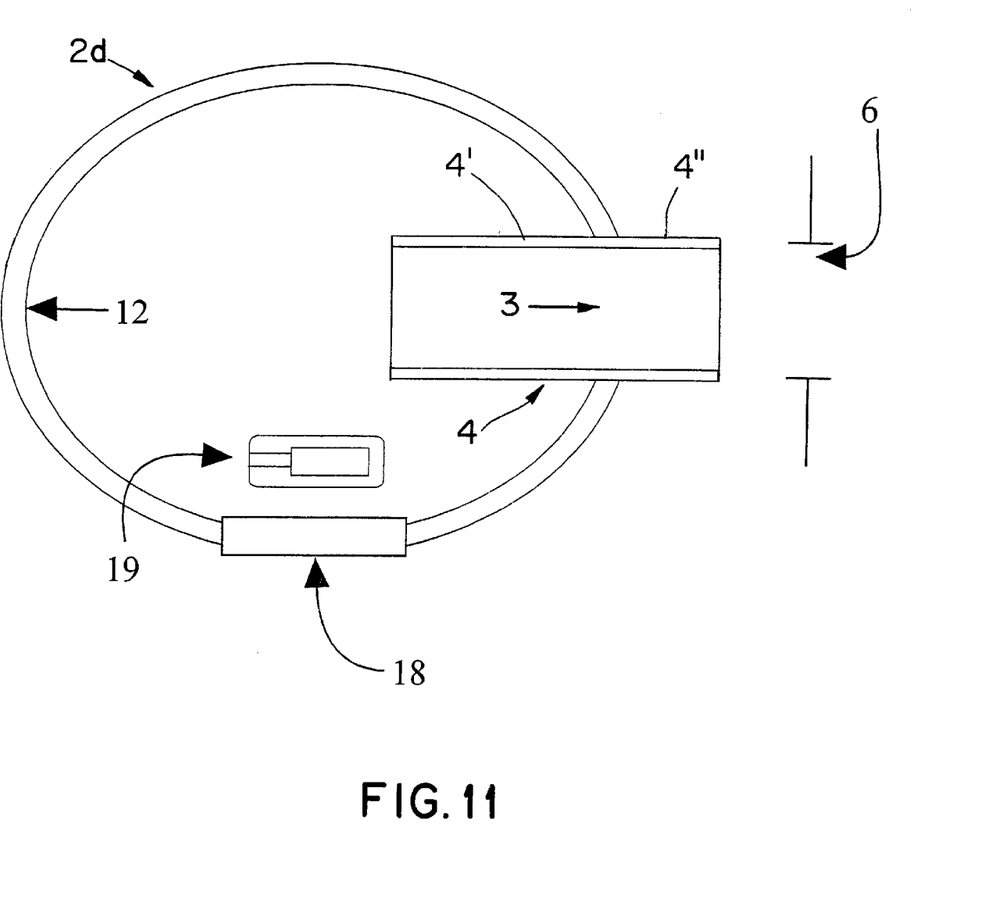
FIG. 11 is a schematic diagram of the system with a light source powered using microwave radiation through a window in the chamber wall.

The use of efficient light sources (such as the Philips Mastercolour CDM-T bulb) would be especially applicable with this invention. However, other types of light sources can be used. For example, FIG. 11 shows a sulphur lamp 19 inside a chamber 2d, which has a window 18 to transmit microwave radiation to power the lamp 19.

Figure 12:
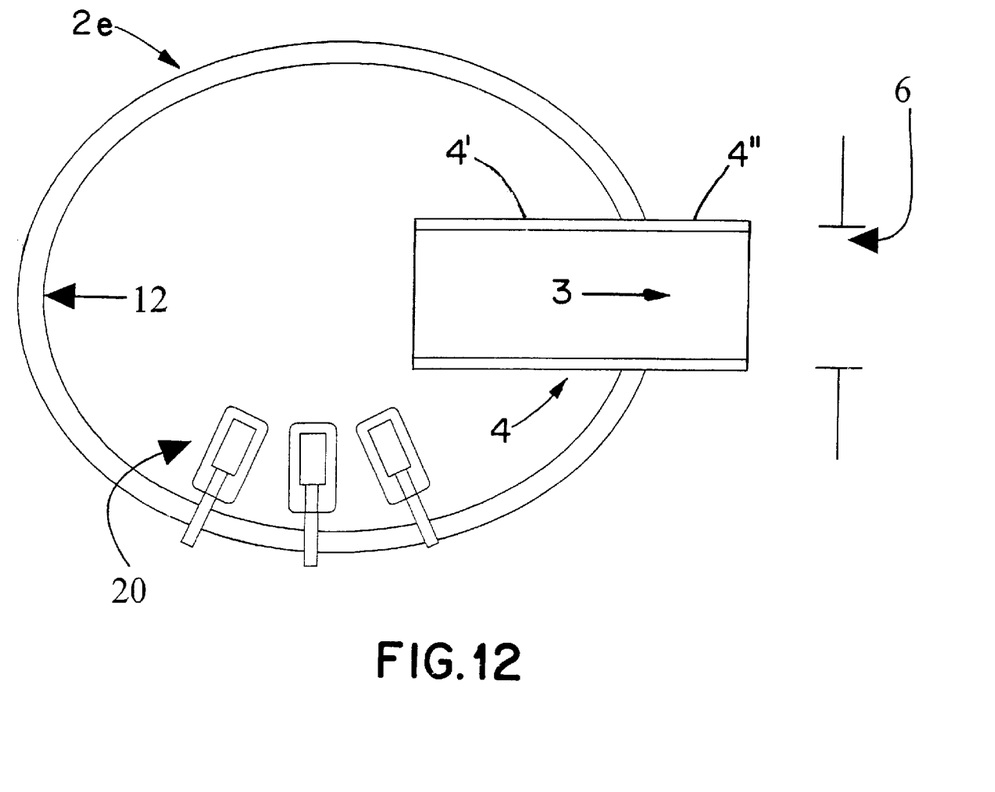
FIG. 12 is a schematic diagram of the system with a plurality of light sources.

The light source may comprise a plurality of emitters. For example, FIG. 12 shows a light source 20 consisting of three emitters within a chamber 2e. In another modification (not shown), a chamber surrounding light source 1 can have a plurality of exit ports.

Figure 13A:
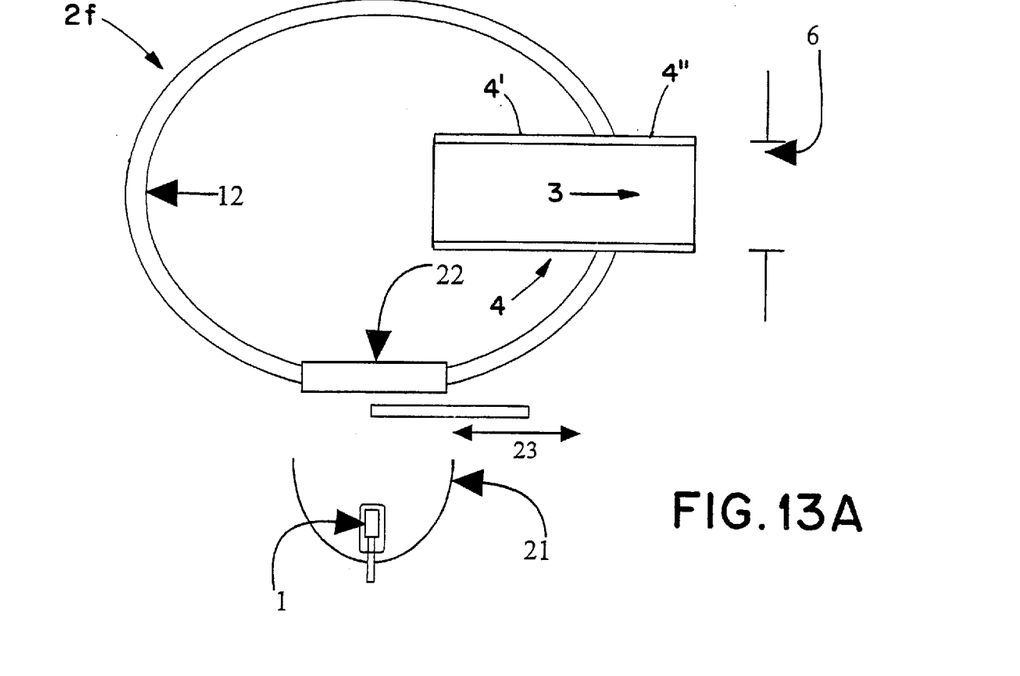
FIGS. 13A and 13B are schematic diagrams of systems with an external light source.
Figure 13B:
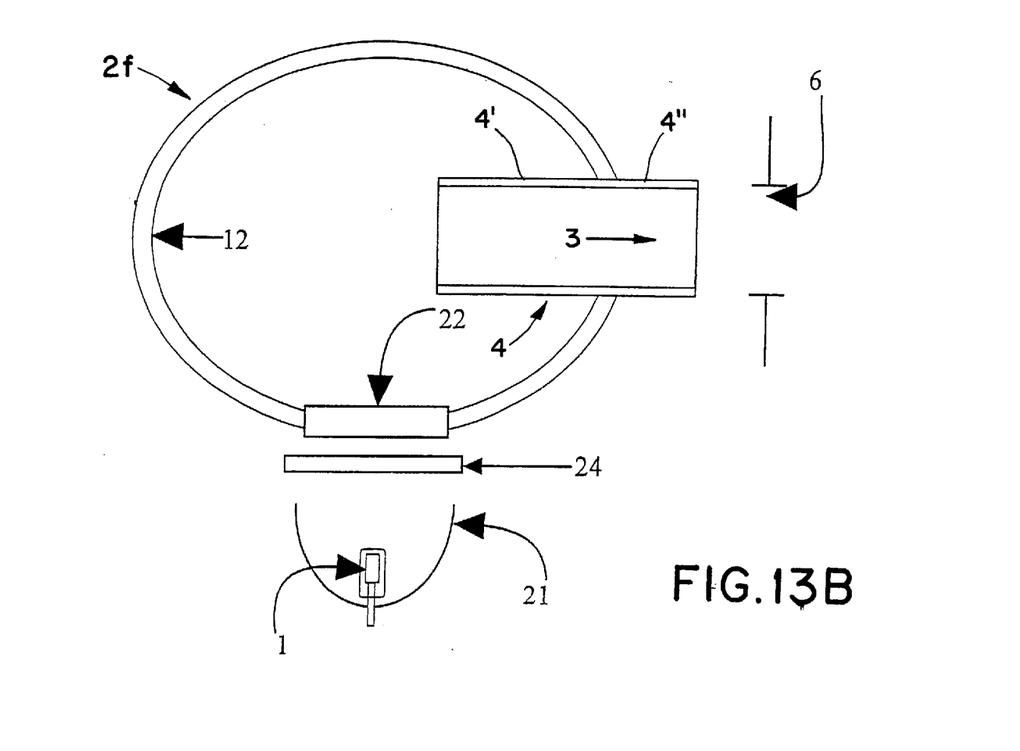

The system can also be used where very high intensity light sources are required. In this case, it may be preferable to position the light source outside the chamber. FIGS. 13A and 13B show two arrangements with an external light source 1 and a collector 21 for directing light from the light source 1 towards an entrance port 22 in the wall of a chamber 2f.

The port 22 could have a reflection/transmission characteristic that transmits visible light into the chamber 2f and reflects infrared radiation (heat) to prevent heat build-up within the chamber 2f.

Alternatively and/or additionally, the collector 21 could have a reflection/transmission characteristic that reflects visible light towards the entrance port 22 and transmits infrared radiation (heat) out of system to reduce heat build-up within the chamber 2f.

The use of an external light source enables the light intensity at the exit port 3 to be controlled mechanically. FIGS. 13A and 13B show two arrangements for this using a sliding cover 23 (FIG. 13A) and an iris diaphragm 24 (FIG. 13B) to vary the size of the entrance port 22 exposed to the light source 1.

The material for the interior coating of the chamber and, where provided, external coating of the internal portion of the colliminating tube, needs to have a minimal absorption of the incident light and to be especially efficient at scattering light. We prefer to use scattering materials having an absorption of less than 5% and more preferably less than 1%.

One material found to be particularly suitable for this is glass powder with a particle size of less than approximately 10 $\mu$m. This powder can be fixed to the inside wall of the chamber using an adhesive or other type of cement, or it could be mixed in a paint, resin, or some other carrier which is either coated onto the inside of the chamber or makes up the structure of chamber. Other scattering materials that may be used include barium sulphate or heat resistant matt white paint.

The scattering materials employed in carrying out the invention may also reflect light to some degree although the main property of the preferred materials is that of scattering to provide a uniform intensity light output.

There are many applications for this type of light source system; Some of these applications include luminaires for stage or theatre lighting, or architectural illumination, sources for video projection (liquid crystal display panels, digital mirror device projections) and for illuminating light guides (optic fibres, transparent conduits).

Figure 14:
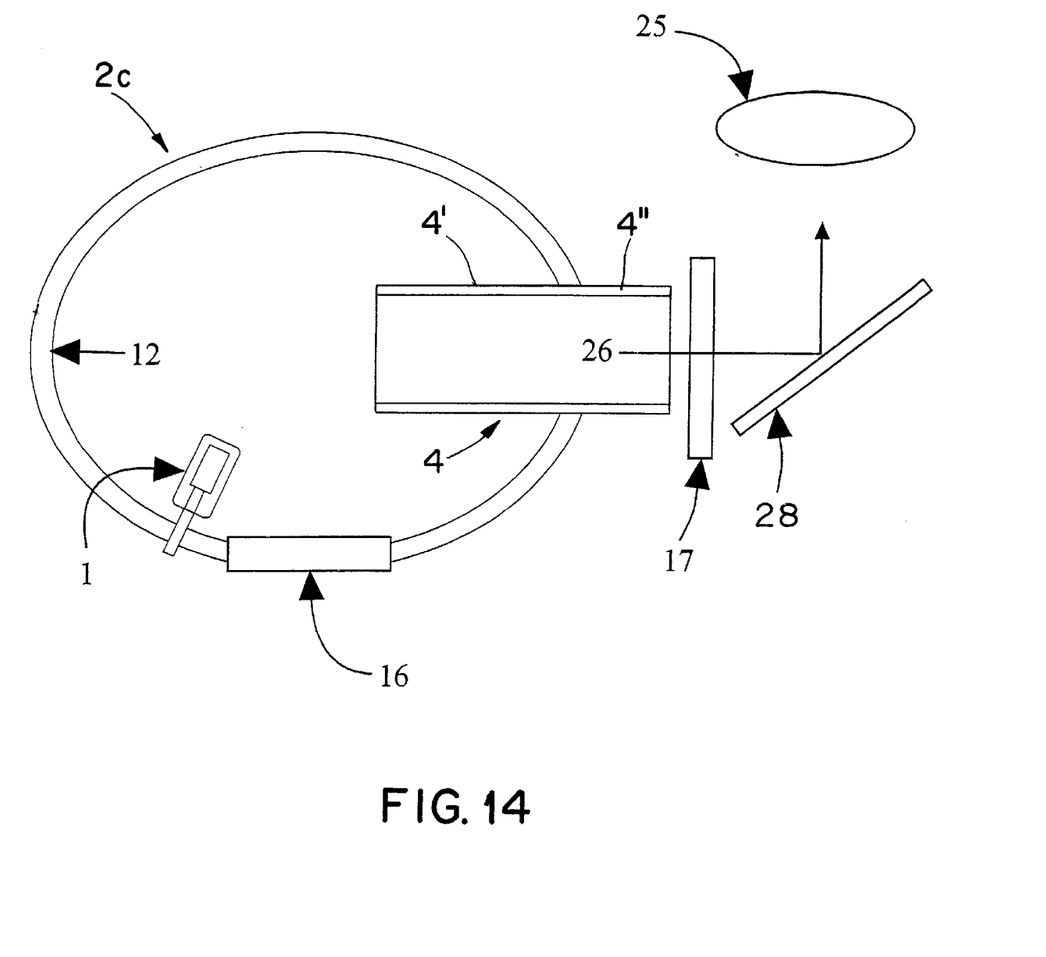
FIG. 14 is a schematic diagram of the system with a reflective video projection device and projection optics at the exit port to provide static or moving image projections.

FIG. 14 shows the addition of a reflective video projection device 28 such as the Texas Instruments Digital Light Processing processor or thin film transistor screen or liquid crystal display, and image projection optics 25 enabling static or moving image projection. A light ray 26 from the exit port shows a typical path to the projection optics 25.

Figure 15:
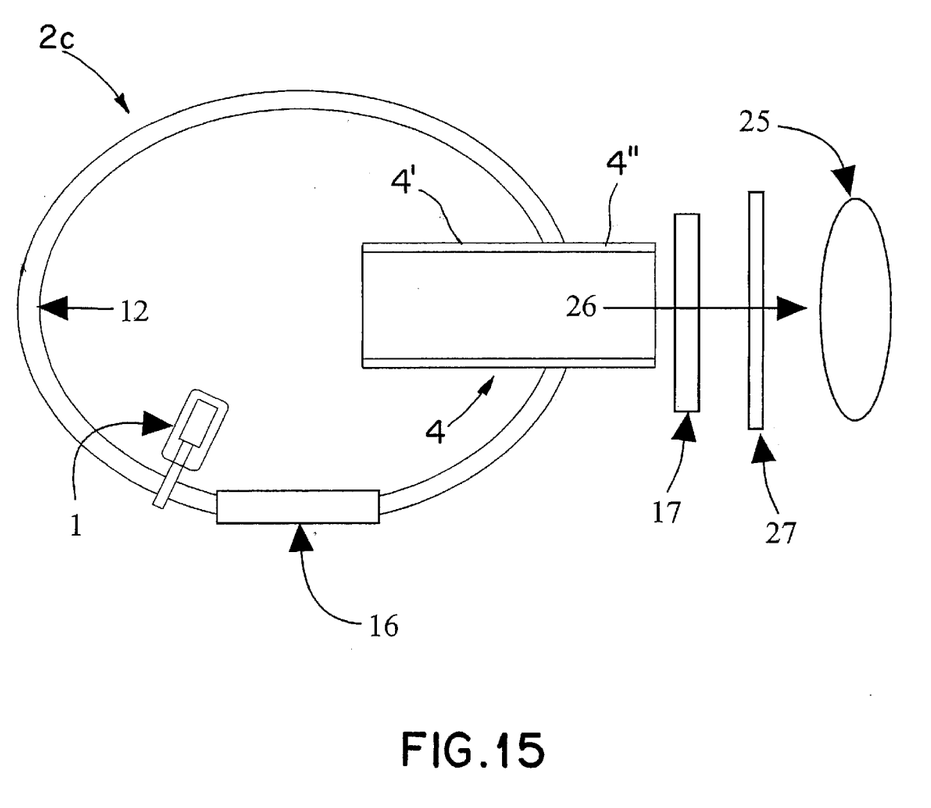
FIG. 15 is a schematic diagram of the system with a transmissive video projection device and projection optics at the exit port to provide static or moving image projections.

FIG. 15 shows the addition of a transmissive video projection device 27 such as a thin film transistor screen or liquid crystal display and image projection optics 25 enabling static or moving image projection. A light ray 26 from the exit port shows a typical path to the projection optics 25.

Other features, benefits and advantages of the invention will be apparent to those of ordinary skill in the art and the invention is deemed to include all variants within the scope of the claims.

We claim:

1. Apparatus comprising a light source, a chamber surrounding said light source, said chamber having an inner surface for scattering light from said light source, and an exit port in said chamber which provides for a light output, the arrangement being such that there is no direct path for light emitted from said light source to said exit port, wherein said exit port is provided with means for collimating said light output, and wherein said collimating means comprises a tube.

2. Apparatus according to claim 1 wherein said tube extends into said chamber and has an outer surface for scattering and/or reflecting light incident on said outer surface within said chamber.

3. Apparatus according to claim 1 wherein said tube extends out of said chamber and has an inner surface for reflecting light incident on said inner surface.

4. Apparatus according to claim 1 further comprising means for transmitting visible light from said light output and reflecting infra-red light from said light output, whereby heat in said light output is reduced.

5. Apparatus according to claim 1 wherein light from said light source is scattered by glass powder on an inner surface of said chamber.

6. Apparatus according to claim 1 wherein said light source is offset relative to the exit port.

7. Apparatus according to claim 1 wherein said light source is aligned with said exit port and is shielded from said exit port.

8. Apparatus according to claim 1 wherein said tube has an inner surface adapted to transmit light incident on said inner surface for further scattering and/or reflection within said chamber.

9. Apparatus according to claim 8 wherein said tube is formed with inclined slats providing openings for transmitting light incident on said inner surface.

10. Apparatus according to claim 1 wherein means is provided for vaying said light output intensity.

11. Apparatus according to claim 10 wherein said light output intensity vary means comprises an adjustable shutter or cover for said light source.

12. Apparatus according to claim 11 wherein said shutter or cover is controlled by a motor or manually.

13. Apparatus comprising a chamber and a light source external of said chamber, said chamber having an inner surface for scattering light from the light source, an entrance port for light from said light source to enter said chamber, and an exit port for a light output, wherein the arrangement of the light source, the entrance port, and the exit port is such that there is no direct path for light emitted from the light source to the exit port, wherein said exit port is provided with means for collimating said light output, and wherein said collimating means comprises a tube.

14. Apparatus according to claim 13 wherein said entrance port transmits visible light and reflects infrared radiation.

15. Apparatus according to claim 13 including a reflector for reflecting light from said light source towards said entrance port.

16. Apparatus according to claim 15 wherein said reflector reflects visible light and transmits infrared radiation.

17. Apparatus comprising:

a light source;

a chamber surrounding said light source, said chamber having an inner surface for scattering light from said light source, and an exit port in said chamber which provides for a light output, the arrangement being such that there is no direct path for light emitted from said light source to said exit port;

optic fibres for collecting said light output for fibre lighting; and means for focusing said light output into said optic fibres comprising ball lenses and spacers between said optic fibres forming pockets for locating said ball lenses.

18. Apparatus comprising a light source, a chamber surrounding said light source, said chamber having an inner surface for scattering light from said light source, and an exit port in said chamber which provides for a light output, the arrangement being such that there is no direct path for light emitted from said light source to said exit port, wherein said chamber is provided with means for reducing heat build-up within said chamber, said chamber heat reduction means comprising a window provided in a wall of said chamber, said window having a reflection/transmission characteristic for reflecting visible radiation back into said chamber and transmitting infra-red radiation from said chamber.

19. Apparatus comprising a light source, a chamber surrounding said light source, said chamber having an inner surface for scattering light from said light source, and an exit port in said chamber which provides for a light output, the arrangement being such that there is no direct path for light emitted from said light source to said exit port, wherein light from said light source is scattered by glass powder on an inner surface of said chamber, and wherein said glass powder has a particle size of less than 10 microns approximately.

* * * * *